(12) United States Patent
David et al.

(10) Patent No.: US 6,421,939 B1
(45) Date of Patent: Jul. 23, 2002

(54) CONTACTLESS CARPET SEAM IRON

(76) Inventors: Michael A. David, 9058 Sandy Ridge, White Lake, MI (US) 48386; Christopher T. Steinhelper, 873 Monticello, Pontiac, MI (US) 48340

( * ) Notice: Subject to any disclaimer, the term of this patent is extended or adjusted under 35 U.S.C. 154(b) by 0 days.

(21) Appl. No.: 09/841,589

(22) Filed: Apr. 24, 2001

(51) Int. Cl.[7] .......................... D06F 75/30; D06F 75/24
(52) U.S. Cl. ................. 38/76; 38/82; 38/93; 156/304.4
(58) Field of Search ........................ 38/76, 77.7, 82, 38/88, 90, 93; 156/391, 304.4, 304.6, 304.7; 219/245, 227, 228

(56) References Cited

U.S. PATENT DOCUMENTS

| | | | | |
|---|---|---|---|---|
| 1,055,951 A | * | 3/1913 | Stegeman | 38/76 |
| 2,629,949 A | * | 3/1953 | Gerber et al. | 38/89 X |
| 3,523,176 A | | 8/1970 | Hill | |
| 3,590,214 A | * | 6/1971 | Kuzyk | 38/88 |
| 3,906,187 A | * | 9/1975 | Turoczi, Jr. | 38/82 |
| 3,927,298 A | | 12/1975 | Prater | |
| 4,438,323 A | | 3/1984 | Milnes | |
| 4,483,896 A | | 11/1984 | Gray et al. | |
| 4,617,083 A | | 10/1986 | Yrizarris | |
| 5,170,038 A | * | 12/1992 | Aida | 38/82 |
| 5,210,394 A | | 5/1993 | Kerremans | |
| 5,252,806 A | * | 10/1993 | Hudson | 38/97 |
| 5,384,001 A | | 1/1995 | Hoopengardner | |
| 6,172,335 B1 | * | 1/2001 | Goodrich | 38/82 |

* cited by examiner

Primary Examiner—Ismael Izaguirre
(74) Attorney, Agent, or Firm—Young & Basile, P.C.

(57) ABSTRACT

A carpet seaming iron is provided for heating adhesive seaming tape without direct contact to the adhesive. The carpet seaming iron has an outer housing forming a cavity therein and a handle with an open end leading to a passageway to the cavity. A heating element is located within the cavity and spaced from a lower base plate. The base plate has apertures therethrough. An electrically operated fan is disposed in the cavity, between the open end of the handle and the heating element. The fan draws ambient atmospheric air through the open end and directs the air past the heating element and through the apertures in the base plate toward the adhesive seaming tape. The air is heated by the heating element so that the air melts the adhesive. The base plate is attached to rollers or ski devices to space the base plate from the adhesive tape.

13 Claims, 2 Drawing Sheets

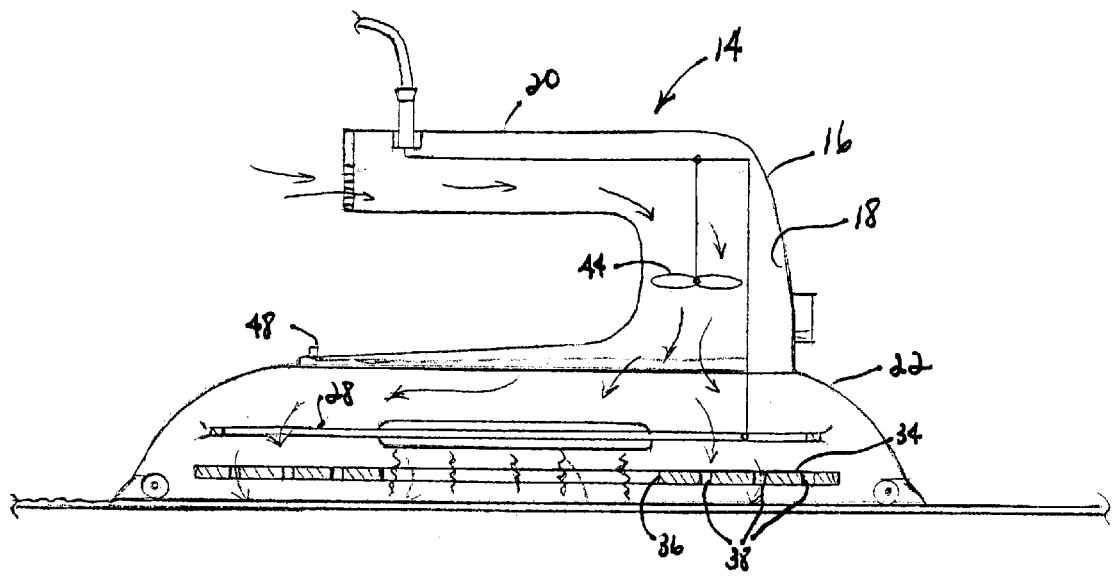
FIG. 3
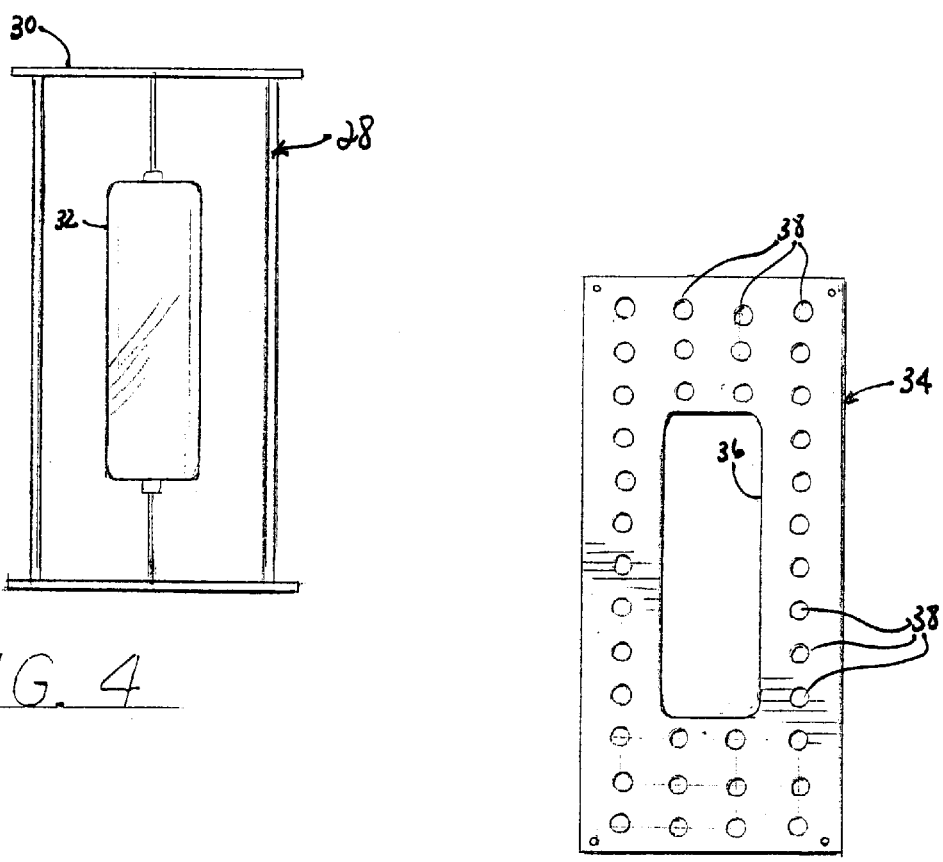
FIG. 4
FIG. 5

CONTACTLESS CARPET SEAM IRON

FIELD OF THE INVENTION

The invention relates to a contactless iron for heating the adhesive on the tape used for seaming carpets.

BACKGROUND OF THE INVENTION

When the width of a room is larger than the typical width of carpeting, it is necessary to abut two edges of carpet together and form a seam with adhesive glue. The adhesive glue is located on a seaming tape that is placed underneath the carpeting. Various devices have been provided to melt the adhesive so that the carpeting can easily and quickly be seamed together. Some irons have a heat plate that is directly laid upon the adhesive. The heat can scorch the adhesive or damage the underlying padding.

SUMMARY OF THE INVENTION

The present invention addresses the aforementioned concerns. A carpet seaming iron is provided which heats and melts the adhesive on a seam tape without the heating element contacting the seam tape. The carpet seaming iron of the present invention includes a base plate having top and bottom surfaces and air passages extending therethrough. The carpet seaming iron further includes a heating means spaced from the base plate. The carpet seaming iron has a housing defining a cavity wherein the heating means is disposed therein and the base plate forms a bottom end wall of the housing. A handle is connected to the housing and has a passage way open to the cavity of the housing. The handle has an open port for receiving atmospheric air which communicates with the passageway. A means is provided for directing the atmospheric air through the air passages in the base plate. The bottom surface of the base plate is spaced from the seam tape to prevent smoking or puddling of the adhesive.

In another aspect of the invention, the means for spacing the bottom surface of the iron from the seam tape includes casters, rollers, or wheels.

In another aspect of the invention, the means for spacing the bottom surface of the iron from the seam tape includes skis attached to the base plate.

In another aspect of the invention, atmospheric air is directed through the air passages of the base plate by means of a fan located within the housing of the carpet seaming iron.

In yet another aspect of the invention, the heating means includes a lamp which also provides illumination while heating the adhesive.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a cross-sectional schematic view taken lengthwise along the carpet seaming iron of FIG. 1, showing the interior of the carpet seaming iron;

FIG. 4 is an elevational view of a heating element for the carpet seaming iron of the present invention; and FIG. 5 is an elevational view of a base plate in the carpet seaming iron of FIG. 1.

DESCRIPTION OF THE PREFERRED EMBODIMENT

Figure 1:
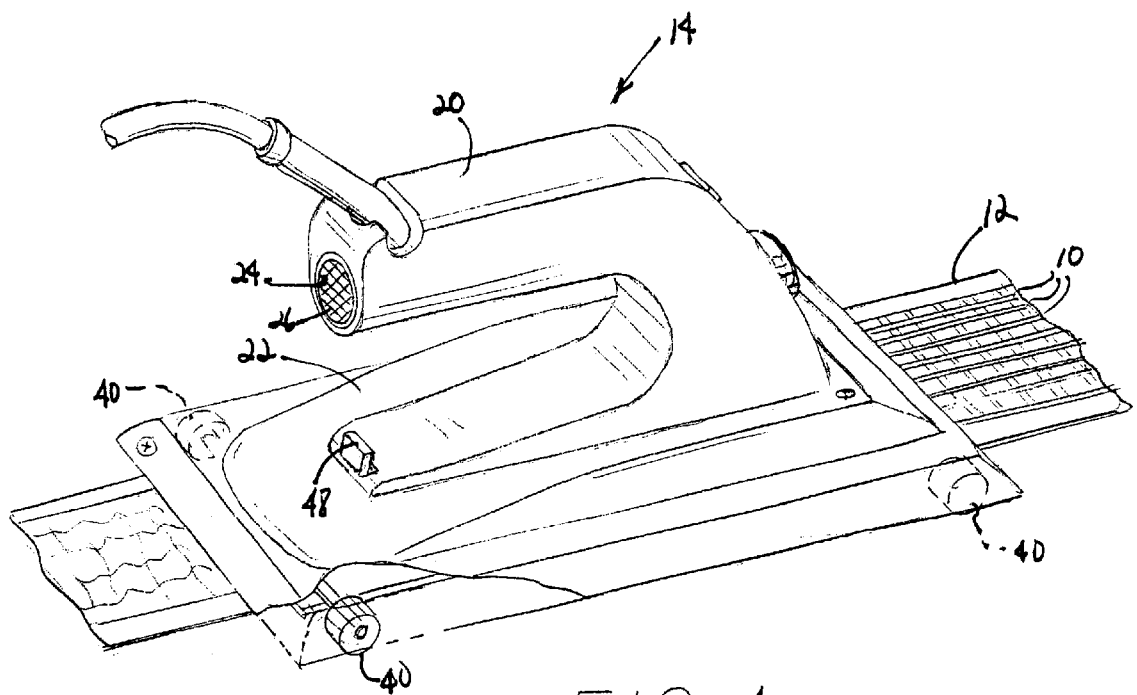
FIG. 1 is a perspective view showing the carpet seaming iron of the present invention riding along an adhesive seam tape.
Figure 2:
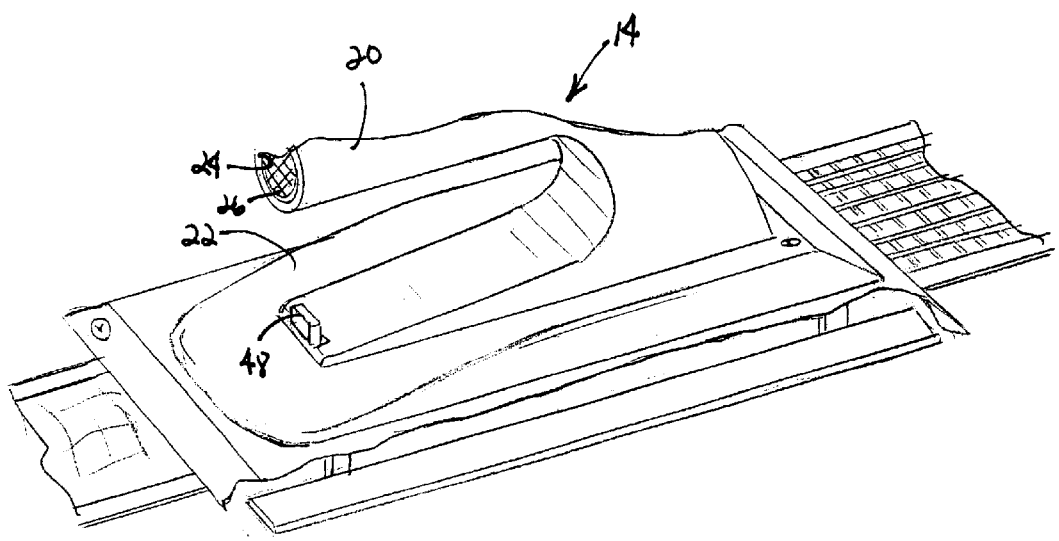
FIG. 2 is a perspective view of a portion of the carpet seaming iron showing a modified embodiment of the iron in FIG. 1.

FIGS. 1 and 2 show the contactless carpet seaming iron of the present invention in operation as it heats the adhesive 10 on a carpet seaming tape 12. The invention is a handheld device having the general outer configuration of a typical iron.

Looking at FIGS. 1–3, the carpet seaming iron 14 has an outer shell 16 forming a cavity 18 therein. The outer shell 16 forms an upper handle portion 20 that extends to a base portion 22. The handle portion 20 has an open port 24 at its terminating point. The open port 24 provides an access for atmospheric air into the interior cavity 18 of the carpet seaming iron 14. The open port 24 may have a screening material 26 covering the port 24 to prevent items or debris from entering the cavity 18 of the carpet seaming iron.

The base portion 22 of the carpet seaming iron has an electroplate 28 positioned in the base portion 22 so that it is parallel with the adhesive tape 12. The electroplate 28 is connected by conventional means to the interior of the base portion 22. FIG. 4 shows an elevational view of the preferred embodiment of the electroplate 28. The electroplate 28 has a frame 30 for supporting a quartz lamp 32. The quartz lamp 32 provides the heat source to melt the adhesive tape 12. The quartz lamp 32 also provides a means of illumination. The quartz lamp 32 is connected to the frame 30 and is centrally located therebetween. The frame configuration allows the atmospheric air to flow around and through the frame 30 and toward an airflow plate or base plate 34. The frame configuration also allows the illumination from the quartz lamp 32 to extend to the carpet seaming tape 12 and the ground to provide light to guide the operator especially in dark areas such as closets.

Located between the electroplate 28 and the adhesive tape 12 is the airflow plate or base plate 34. The airflow plate 34 may be connected to the electroplate 28 or connected to the interior of the base portion 22. The airflow plate 34 is spaced from the electroplate 28 such that the quartz lamp 32 is not in direct contact with the airflow plate 34. As shown in FIG. 3, the airflow plate 34 is parallel to the electroplate 28 and to the adhesive tape 12.

FIG. 5 shows an elevational view of the airflow plate 34 of the preferred embodiment. The airflow plate 34 preferably has a centrally located aperture 36 having a similar configuration and location within the airflow plate 34 as the quartz lamp 32 has relative to its frame 30. Aperture 36 allows the quartz lamp 32 to extend close to the airflow plate 34 without actually touching the plate 34. Surrounding the centrally located aperture 36 are a plurality of small apertures 38 extending through the airflow plate 34. The plurality of small apertures 38 provide an airflow path past the airflow plate 34 to the adhesive tape 12.

The electroplate 28 and the airflow plate 34 are connected and positioned within the cavity of the base portion 22 of the carpet seaming iron so that the airflow plate 34 is raised from the adhesive tape 12. The airflow plate 34 is maintained in an elevated position relative to the adhesive tape 12 on the floor by means of wheels, rollers, or coasters 40, as shown in FIG. 1, or skis 42, as shown in FIG. 2. The front pair of wheels, rollers, or coasters 40 are spaced from each other by at least the width of the adhesive tape 12. The spacing of the pair of rear wheels, rollers, or coasters is also at least the width of the adhesive tape 12. Similarly, the pair of skis 42 are spaced from each other by the width of the adhesive tape 12. The wheels 40 and skis 42 allow the iron to smoothly travel over an adhesive tape 12 without interfering or coming into contact with the adhesive. The wheels 40 and skis 42 also help to elevate the airflow plate 34 and the electroplate 28 above the adhesive tape 12. Therefore the heating element does not come into contact with the glue to cause puddles or to overheat the glue which can result in smoke. As a result, less glue is required than in previous carpet seam irons.

A small fan 44 is disposed within the cavity 18 of the carpet seaming iron 14. The fan 44 is preferably positioned proximate to the open port 24 within the narrow passageway of the handle portion 20, although the fan 44 can be positioned anywhere upstream from the electroplate 28 and the airflow plate 34. When the fan 44 is activated, the fan 44 draws in ambient air through the open port 24 and into the cavity 18 of the iron 14. The fan 44 blows the ambient air across the electroplate 28 which heats the air as it passes. The air is then blown and directed through the airflow plate 34 through the apertures 38 down to the adhesive tape. Both the fan 44 and the quartz lamp 32 in the electroplate 28 are connected to a electrical power source (not shown). An ON/OFF switch 48 may be provided to activate the fan 44 and the quartz lamp 32.

Although the electroplate 28 may provide other sources of heat, such as electric coils (not shown), a quartz lamp provides the added advantage of illuminating the area that is being taped. This feature benefits the operator when carpeting inherently dark spaces such as hallways and closets.

In operation, the carpet seaming iron 14 is heated by supplying electricity to the quartz lamp 32. Once the quartz lamp 32 is hot, the carpet seaming iron 14 is moved along the longitudinal length of the carpet seaming tape 12. The heat from the quartz lamp 32 melts the adhesive 10 as the iron 14 passes over it. Once the melted adhesive is exposed after the iron has past it, the operator may press the edges of the carpet into the melted adhesive into an abutting relationship.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A carpet seaming iron comprising:

a base plate having a top surface and a bottom surface and air passages extending from the top surface to the bottom surface;

a heating means spaced from the top surface of the base plate;

a housing defining a cavity, wherein the heating means is disposed therein and the base plate forms an end wall of the housing;

a handle mounted to the housing and having a passageway open to the cavity of the housing, said handle having an open port for receiving atmospheric air and communicating with the passageway;

means for directing the atmospheric air through the air passages of the base plate;

means for providing electrical power to the heating means and air directing means; and means to space the bottom surface of the base plate from the seam tape.

2. The carpet seaming iron of claim 1, wherein the means to space the bottom surface from the seam tape includes casters attached to the bottom surface of the base plate.

3. The carpet seaming iron of claim 1, wherein the means to space the bottom surface from the seam tape includes wheels attached to the bottom surface of the base plate.

4. The carpet seaming iron of claim 1, wherein the means for directing atmospheric air is a fan positioned in the passageway of the handle.

5. The carpet seaming iron of claim 1, wherein the heating means is an electroplate.

6. The carpet seaming iron of claim 4, wherein the fan is positioned in the cavity.

7. The carpet seaming iron of claim 1, wherein the means to space the bottom surface from the seam tape includes at least one ski attached to the bottom surface of the base plate.

8. The carpet seaming iron of claim 1, wherein the base plate has a center through aperture for receiving a portion of the heating means.

9. The carpet seaming iron of claim 1, wherein the heating means includes a lamp.

10. The carpet seaming iron of claim 9, wherein the lamp is centrally positioned within a frame.

11. The carpet seaming iron of claim 10, wherein the base plate has a center through aperture for receiving a portion of the lamp.

12. The carpet seaming iron of claim 1, wherein the base plate has a plurality of small apertures therethrough.

13. The carpet seaming iron of claim 8, wherein the base plate has a plurality of small apertures therethrough, adjacent to said through aperture.

* * * * *